United States Patent
McIntosh et al.

[15] 3,696,247
[45] Oct. 3, 1972

[54] VEHICLE EXHAUST EMISSIONS ANALYZER

[72] Inventors: Lionel D. McIntosh, 2101 Lufkin Drive, N.W., Huntsville, Ala. 35810; Daniel E. Weber, 6421 Marsh Ave., both of Huntsville, Ala. 35806

[22] Filed: Nov. 12, 1970

[21] Appl. No.: 88,784

[52] U.S. Cl..........250/83.3 H, 250/43.5 R, 250/218, 356/51, 356/93, 356/97
[51] Int. Cl.......G01j 3/42, G01n 21/12, G01n 21/26
[58] Field of Search....250/43.5 R, 83.3 H, 218, 226; 356/74, 81, 88–101, 51

[56] References Cited

UNITED STATES PATENTS

| | | | |
|---|---|---|---|
| 3,519,816 | 7/1970 | Bartz et al. | 356/51 X |
| 3,569,696 | 3/1971 | Karlson | 250/43.5 R |
| 3,588,496 | 6/1971 | Snowman | 356/51 X |
| 3,593,023 | 7/1971 | Dodson et al. | 250/43.5 R |
| 2,829,275 | 4/1958 | Golay | 250/226 X |
| 3,171,882 | 3/1965 | Baird | 356/81 |
| 3,562,522 | 2/1971 | Cederstrand et al. | 356/97 X |

OTHER PUBLICATIONS

Agnew et al: J.O.S.A., volume 4, No. 2, Feb. 1951 pages 76– 79.
Zeeman et al: Analyst, Vol. 93, June 1968, pages 388–393.
Mavrodineanu et al: Applied Optics, Vol. 7, No. 7, July 1968, pages 1281– 1285.

Primary Examiner—Ronald L. Wibert
Assistant Examiner—F. L. Evans
Attorney—Talburtt and Baldwin

[57] ABSTRACT

An infrared absorption analyzer for measuring the concentration of CO, $CO_2$, H-C and NO in a stream of vehicle exhaust emissions passing through the same sampling cell. The analyzer employs a single source of infrared radiation and a double beam optical comparator system, which is common to and shared by all of the measuring channels, and a dispersive type spectrophotometer, which has a plurality of exit slits and a single entrance slit through which it is alternately excited by respective ones of the beams, one of which passes through the sampling analytical cell.

11 Claims, 8 Drawing Figures

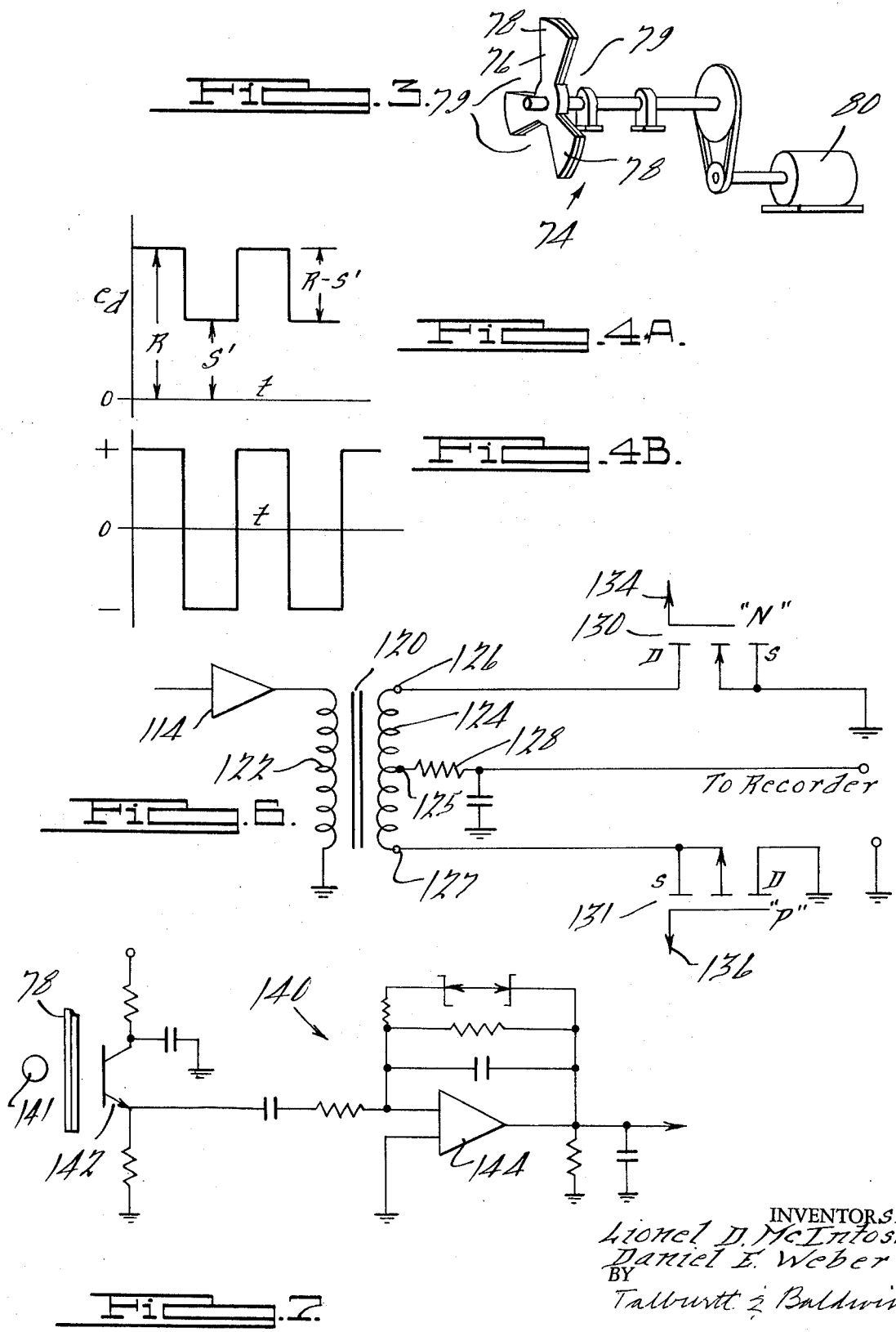

VEHICLE EXHAUST EMISSIONS ANALYZER

BACKGROUND AND SUMMARY OF THE INVENTION

This invention relates to a vehicle exhaust emissions analyzer for measuring the concentration of each of a plurality of different gaseous components, including CO, $CO_2$, H-C and NO, in a stream of vehicle exhaust gases.

The invention has for its object to provide an improved form of analyzer apparatus, which is specially suited to the rapid and reliable analysis of automotive exhaust emissions and features a novel assembly of parts organized to effect a significant reduction in cost and size of the apparatus, while simplifying the operation thereof, over existing forms of vehicle exhaust analyzers.

Towards the accomplishment of the above and other objects, the apparatus in brief summation comprises a double beam optical comparator in which a reference beam and sampling beam are derived from a single source of infrared radiation. The sampling beam is directed through the sample cell for selective absorption of the energy thereof in selected bands or wavelengths of the infrared spectrum in accordance with the concentration of the components under analysis flowing through the common analytical sample cell. The reference beam and the sampled beam are periodically alternately presented upon and through a stationary entrance slit of a dispersive type spectrophotometer, which disperses the radiation incident thereon into spectral lines of the infrared spectrum. The spectrometer has a plurality of exit slits spaced to pass the dispersed radiation in selected bands of the infrared spectrum identified with the components under analysis.

Behind such exit slit is a different one of a plurality of infrared detector devices each of which is time shared or alternately excited by the dispersed component of the reference beam and the sampled beam passing through the exit slit associated with that detector. Each detector produces an electrical signal, which is modulated in accordance with the intensity of the dispersed reference beam and the sampled beam passing through the exit slit for that detector and represents the differential absorption by the component of interest identified with that exit slit.

The apparatus, both as to its further structural organization and operation, will be understood from consideration of the description of the preferred embodiment of the invention made with reference to and following the accompanying description of the drawings.

DESCRIPTION OF THE DRAWINGS

FIG. 3 illustrates a form of chopper device employed in the optical system of FIG. 1;

FIG. 4A illustrates the output waveform of a typical one of the detectors of FIG. 2;

FIG. 4B illustrates the output waveform of one of the components of the system;

FIG. 5 is a functional block diagram representation of a typical one of the electrical signal processing channels associated with the optical system of the analyzer of the present invention;

FIG. 6 is a schematic electrical circuit diagram of a synchronous demodulator stage of FIG. 5; and FIG. 7 is a schematic electrical circuit diagram of a synchronous switching circuit which produces the output waveform of FIG. 4B and is connected to the synchronous demodulator stage of each signal processing channel.

DESCRIPTION OF THE PREFERRED EMBODIMENT

Figure 1:
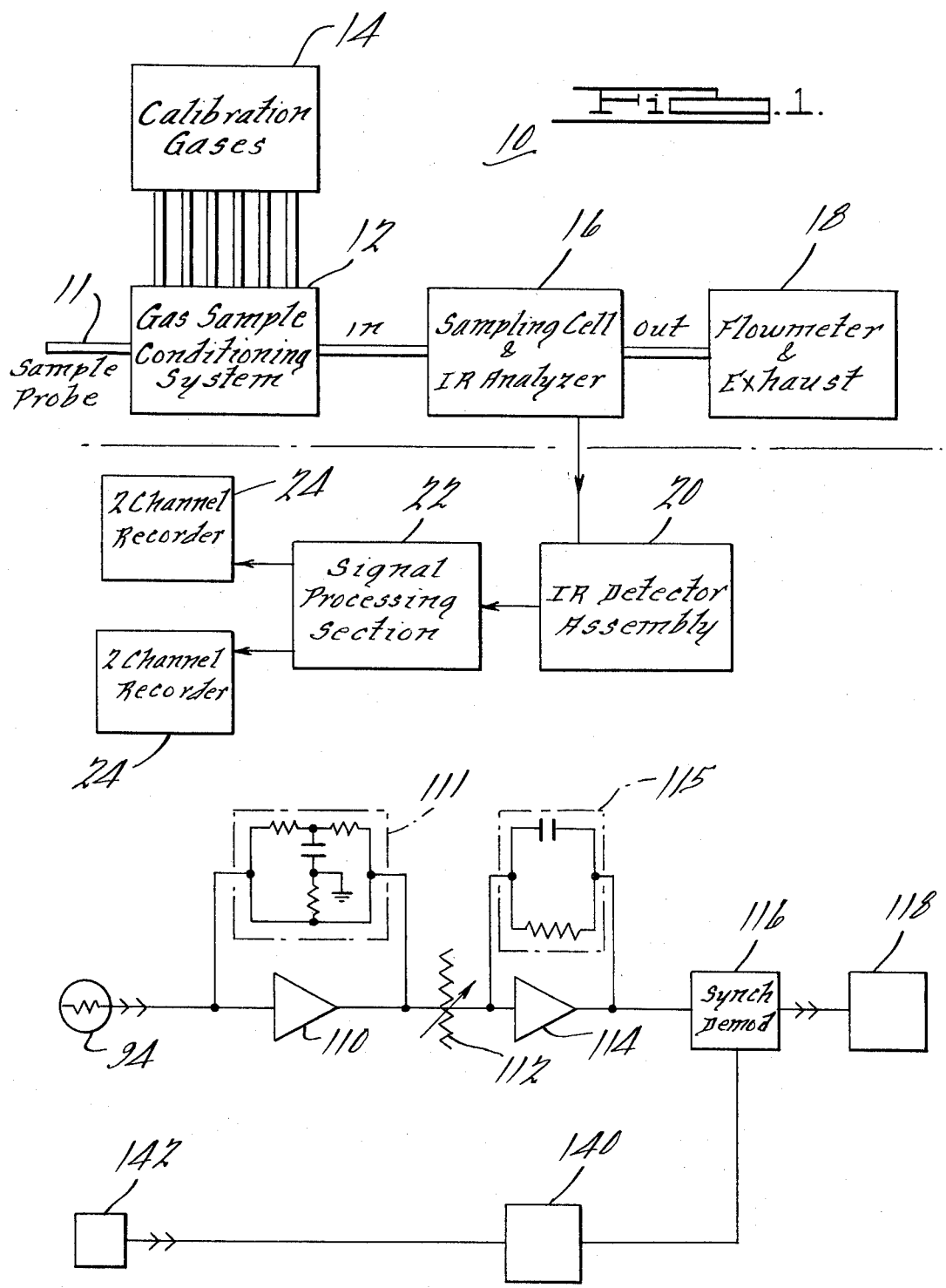
FIG. 1 is a functional block diagram of the general organization of the various components forming the apparatus of the present invention.
Figure 2:
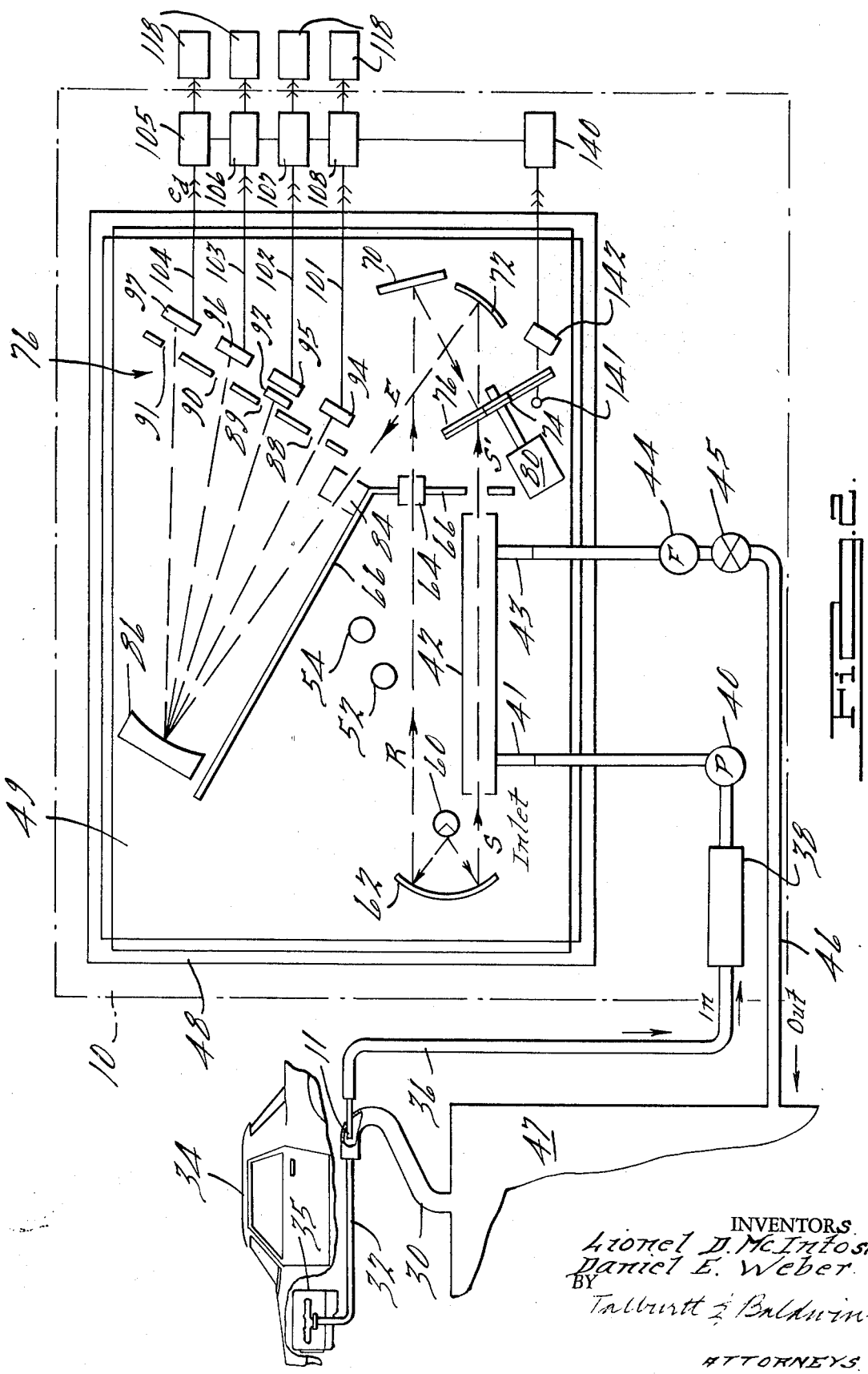
FIG. 2 is a schematic representation of the optical system of the invention.

With reference to FIGS. 1 and 2 of the drawings, the exhaust gas analyzer 10 is shown in functional block diagrammatic form in FIG. 1 as comprising a sample probe 11, gas sample conditioning system 12, a supply of calibration gases 14, and optical infrared analyzer 16, a flow meter and exhaust section 18, an infrared electrical detector section 20, an electrical signal processing section 22 and multi-channel electrical recorder section 24.

The sample probe 11 is a small tube which is inserted into an externally vented exhaust duct 30 attached to the tailpipe 32 of an automotive vehicle 34. The vehicle 34 is powered by an internal combustion engine 35 from which the exhaust emissions, notably carbon monoxide, carbon dioxide, hydrocarbons and nitrogen oxide, are to be measured at and over different vehicle operating conditions in accordance with a specified vehicle standards emission test cycle.

The exhaust sample from the pickup probe 11 is conducted through a flexible hose 36 to the gas sample conditioning system within the analyzer where it is cooled by a mechanical refrigeration and dehydrator unit shown at 38 to a temperature of approximately 35° C. to remove water vapor from the sample. From the dehydrator, the gas sample enters a pump 40 and is forced at a constant flow and pressure into the inlet 41 of an analytical sample chamber 42 which is of an optimized length of 12 inches for the several different gas components of interest flowing therethrough. From the outlet 43 of the chamber, the exhaust stream passes through a flow meter 44 and regulator 45 and then through an outlet conduit 46 from the analyzer cart to an atmospheric region 47 outside of the room in which the analysis is being performed.

The analytical chamber 42 is shown in FIG. 2 together with the optical components of the analyzer section which are contained in an enclosed optical cabinet and mounted on a jig plate 48 covered by an inverted pan-shaped housing 49 removably attached to the plate. Suitable sealing means, as a sealing gasket (not shown) between the plate and the housing are provided to control the atmosphere within the optical section in which there is provided one or more holders 52 and 54 for a suitable dessicant, as Silica Gel, and a carbon dioxide absorbing substance to remove traces of water vapor and carbon dioxide that may be formed and/or admitted within the interior of the optical cabinet.

The optical analyzer section uses a double beam comparator system derived from a single Globar type source 60 of infrared radiation located at the 15 cm.

focal center of a 4 inch diameter collimating mirror 62. Radiation incident on the mirror 62 is reflected and redirected thereby along parallel paths with the sampling call 42 located in the path of a portion of the collimated beam, hereinafter called the sampling beam entering the cell through the entrance window at one end thereof. Another portion of the collimated beam is used as a reference comparison beam which is directed along a path R outside of the sampling cell 42 and passes through an adjustable iris diaphragm 64 for adjusting the intensity of the reference portion of the collimated beam, which has a slightly greater total path length than the sampling beam. The diaphragm 64 is shown mounted in a shield 66, which keeps unwanted radiation from the source from entering the remaining portion of the optical analyzer section shown as further including a folding mirror 70, a focusing mirror 72, a chopper 74 and a multi-slit spectrophotometer 76.

The folding mirror 70 is a stationary plane mirror which reflects and directs the portion of the reference beam incident or impinging thereon upon a first surface mirror 76 provided on one side of the chopper device 74. As shown in FIG. 3, the chopper 74 is formed with three equally spaced vanes 78 or light intercepting portions, the mirrored front surface of each of which blades reflects and redirects the portion of the incident reference beam upon the stationary focusing mirror 72, which has a 15 cm. focal length. It will be seen that the portion of the reference beam passing through the intervening or light transmitting spaces 79 between the light intercepting portions or blades 78 of the chopper 74 does not reach the focusing mirror 72. The reference beam is thus chopped or periodically interrupted by the chopper, which is the only moving part of the analyzer section and is rotatively driven by a synchronous motor 80 through a belt drive speed reduction system to provide a chopping rate or frequency of 100 cycles per second.

It will be noted that the chopper is also located in the path of the sampled beam S' emerging from the exit window or end of the sampling cell 42 and that the sampled beam passes through the intervening or light transmitting spaces 79 between the blades or light intercepting portions of the chopper to impinge upon the focusing mirror 72 during those intervals when the reference beam is being transmitted through the intervening spaces 79 between the blades of the chopper. It will thus be appreciated that at any instant of the time, only one or the other of the beams R or S' will be incident or impinging upon the focusing mirror 72. The chopper thus blocks or interrupts the reference beam and the sampled beam in alternating succession from transmission to the focusing mirror 72, which focuses and redirects the radiation incident thereon along the same path E upon and through the stationary entrance slit 84 of the spectrometer.

In addition to the single entrance slit 84, the spectrometer 76 has a fixed concave grating 86, which diffracts and disperses radiation incident thereon into spectral lines, and a plurality of exit slits 88, 89, 90 and 91, which are located at and are arcuately spaced apart on the optical or Rowland circle a distance to pass the dispersed radiation in selected bands of the infrared spectrum identified with the components under analysis. Exit slit 88 corresponds to the $CO_2$ measuring channel and is at or tuned to the carbon 13 isotope absorption band approximately 4.4 microns in wavelength in order to keep the $CO_2$ measuring channel of the analyzer apparatus from saturating in view of the 12 inch length of the optimized single sampling cell 42 being used for the several measuring channels.

Behind each exit slit 88–91 is a different one of a plurality of infrared responsive, solid state type detectors 94, 95, 96 and 97 each of which is time shared or alternately excited by the dispersed component of the reference beam and the sampled beam passing through the exit slit associated with that detector. Each detector thus produces a modulated electrical output signal therefrom of the character shown in FIG. 4A in which the signal produced by the reference beam is identified as having a level R and the sampled beam produces a signal of the level S. The difference between the sample beam and the reference beam signals is a measure of the absorption the sample beam has suffered in the cell. In order to eliminate optical cross talk between the adjacent CO measuring channel identified with exit slit 90 and the $CO_2$ channel, a 3 cm. gas cell filter 92 is located in front of the $CO_2$ detector 95.

The output of each detector 94–97 is supplied over a separate electrical conductor or cable 100–103 to the input of a different one of a plurality of signal processing channels 105–108, which are fundamentally identical except for the parameter values of certain of the resistor and condenser components thereof controlling the response or time constant of each channel. The organization of a typical one of the signal processing channels is shown in FIG. 5 as comprising a first operational preamplifier 110, a gain adjusting potentiometer 112, a second operational amplifier 114, and a synchronous demodulator 116 the output of which is applied to one channel of a multi-channel strip chart recording device 118.

The operational amplifiers 110 and 114 are conventional, commercially available solid state devices and are of identical construction except that the preamplifier 110 has a "T-notch" filter 111 associated therewith to permit it to respond only to signals of the 100 cps chopping rate of the chopper 74 and that the amplifier 114 has a time constant controlling R-C feedback circuit 115 associated therewith controlling the response time of its associated channel.

The synchronous demodulator 116 is a form of balanced demodulator or detector circuit which produces an output voltage therefrom corresponding to the modulation component or the difference between the signal levels of the reference beam and sampled beam incident on a detector of the spectrometer. The demodulator employed herein uses field effect transistors and is shown in electrical schematic form in FIG. 6 as including an interstage coupling transformer 120, the primary winding 122 of which is connected to the output of the operational amplifier 114. The center-tapped secondary winding 124 is connected from the center tap 125 thereof through an R-C filter 128 to the potentiometric type recorder device 118.

One end 126 of the transformer secondary winding 124 is connected to the drain electrode D of an "N" channel field effect transistor 130, the auxiliary gate electrode and the source electrode of which are connected to reference ground. The other end 127 of the transformer secondary winding 124 is connected to the source electrode s and auxiliary gate electrode of an opposite polarity "P" channel field effect transistor 131, the drain electrode D of which is connected to reference ground. The main gate electrodes 134, 136 of the field effect transistors 130 and 131 are connected to the output of a switching circuit 140 which is connected to the demodulator circuit 116 in each of the signal processing channels, as indicated in FIG. 2.

The switching circuit 140 is operated from and in synchronism with the chopper 74 and includes a prefocused light source 141 located on one side of the mirrored chopper 74, a photodiode detector 142 located on the other side of the chopper and an operational amplifier 144, the schematic electrical circuit of the synchronous switching circuit 140 being shown in FIG. 7. The output of the switching circuit 140 is of a repetitive square wave pulse form, which is displaced in amplitude by an equal amount above and below 0 volts ground reference level as shown in FIG. 4B and is applied to the main gate electrodes 134,136 of the field effect transistors 130,131 of the demodulator circuit 116 in each of the signal processing channels.

What is claimed is:

1. A multi-channel, dispersive infrared absorption type analyzer apparatus for measuring the concentration of each of a plurality of different gaseous components in a stream of vehicle exhaust emissions passing through the same sampling cell, said apparatus comprising a single source of infrared radiation and a double beam optical comparator system common to and shared by each of the measuring channels of the analyzer, a dispersive type spectrometer having a plurality of exit slits each identified with a different one of the components under analysis and a single stationary entrance slit through which the spectrometer alternately receives respective ones of the two beams of the optical system one of which beams passes through the sampling cell, means for alternately presenting said beams to the entrance slit of said spectrometer, a plurality of infrared detector devices each positioned behind a different one of said exit slits and producing an electrical output signal modulated in accordance with the difference in intensity of the dispersed beams and a plurality of signal processing channels each connected to receive the output signal of a different one of said detector devices and including signal translating means therein producing an output signal therefrom corresponding to the different in intensity between the dispersed beams incident on a respective one of said detector devices.

2. Analyzer apparatus in accordance with claim 1 wherein said means for alternately presenting includes a chopper device located in the path of both of said beams and operable to interrupt the transmission of one of said beams to said entrance slit when the other beam is being transmitted thereto and a focusing member common to and located in the path of both of said beams between said chopper device and said entrance slit for directing the chopped beams along the same path through said entrance slit into said spectrometer.

3. Analyzer apparatus in accordance with claim 1 wherein each of said signal processing channels includes a synchronous balanced demodulator having a pair of opposite polarity field effect transistors in the respective demodulation branches thereof and a synchronous switching circuit operated from and in synchronism with said chopper device and connected to the field effect transistors in the demodulator of each signal processing channel.

4. An absorption type, dispersive infrared analyzer apparatus for analysis of vehicle exhaust gas emissions including CO, $CO_2$, HC and NO, said analyzer apparatus comprising, in combination, a source of infrared radiation, means deriving a reference beam and a sampling beam from radiation received from said source and directing said beams along two different paths, a single sampling cell having an inlet adapted to be connected to the vehicle exhaust and an outlet in communication with the atmosphere, said cell located in the path of said sampling beam for selective absorption of a portion of the radiation directed therethrough by the aforementioned components of the vehicle exhaust gases in accordance with the concentration thereof passing through the cell, a spectrometer having an entrance slit, means for dispersing radiation entering said slit into spectral lines of the infrared spectrum, and a plurality of exit slits spaced to pass the dispersed radiation in selected bands of the infrared spectrum identified with the aforementioned components of the exhaust gas, means located in the path of the reference beam and the sampling beam for directing the reference beam and the sampling beam alternately into said spectrometer through said entrance slit, a plurality of infrared detectors each positioned behind a different one of said exit slits and providing an electrical signal corresponding to the intensity of the radiation passing through its associated slit, a plurality of signal processing channels each connected to a different one of said detectors and providing a signal output therefrom corresponding to the difference in intensity between the reference beam and sampling beam passing through the exit slit for the detector corresponding to that channel, and signal utilization means connected to receive the output signal from respective ones of said channels.

5. Analyzer apparatus in accordance with claim 4 wherein said means for directing the reference beam and sampling beam alternately into said spectrometer includes chopper means located in the path of both said beams and operated to interrupt transmission of one beam to said entrance slit when the other beam is being transmitted therethrough and a focusing mirror common to and located in the path of both said beams between the chopper means and said entrance slit for directing the chopped reference beam and the chopped sampling beam along the same path through said entrance slit into said spectrometer.

6. Analyzer apparatus in accordance with claim 5 further including a plane mirror in the path of said reference beam and wherein said chopper means has a mirrored surface on one side thereof facing said plane mirror to reflect the reference beam upon said focusing mirror.

7. Analyzer apparatus in accordance with claim 6 including an adjustable iris diaphragm member in the path of the reference beam to adjust the intensity thereof relative to the sampling beam and compensate for any difference in the optical path lengths thereof.

8. Analyzer apparatus in accordance with claim 5 wherein the only moving part of the optical apparatus is said chopper means.

9. Analyzer apparatus in accordance with claim 5 wherein each of said signal processing channels comprises a balanced demodulator having a pair of opposite polarity field effect transistors therein and includes a synchronous switching circuit operated from and in synchronism with said chopper means and connected to the field effect transistors of each demodulator in each signal processing channel.

10. Analyzer apparatus in accordance with claim 5 wherein said sampling cell is of an optimized length for $CO$, $CO_2$, H-C and NO gases and wherein the $CO_2$ exit slit of said spectrometer is tuned to the carbon 13 isotope to prevent saturation of the $CO_2$ measuring channel due to the optimized sampling cell common to each measuring channel.

11. Analyzer apparatus in accordance with claim 5 wherein said spectrometer includes a cell filter between the exit slit and the detector device of the $CO_2$ channel thereof to prevent optical cross talk between the CO and the $CO_2$ channels.

* * * * *